United States Patent [19]
Shelton

[11] 3,973,916
[45] Aug. 10, 1976

[54] EMISSIONS CONTROL SYSTEM FOR AN AUTOMOTIVE VEHICLE OR THE LIKE

[76] Inventor: Everett E. Shelton, 506 W. College St., Harrisburg, Ill. 62946

[22] Filed: Apr. 1, 1974

[21] Appl. No.: 456,904

[52] U.S. Cl. .......................... 23/277 C; 23/288 FB; 60/284; 106/40 R; 123/146.5 A; 264/44
[51] Int. Cl.² ...................... B01J 8/00; F01N 3/10
[58] Field of Search ........ 23/277 C, 288 F, 288 FA, 23/288 FB, 288 FC

[56] References Cited
UNITED STATES PATENTS

| 1,773,256 | 8/1930 | Breitwieser .................... 23/277 C X |
| 2,880,079 | 3/1959 | Cornelius ...................... 23/277 C X |
| 3,441,381 | 4/1969 | Keith et al. ................... 23/277 C X |

FOREIGN PATENTS OR APPLICATIONS

| 631,368 | 9/1933 | Germany .......................... 23/288 F |

Primary Examiner—Jack Sofer
Assistant Examiner—Barry I. Hollander
Attorney, Agent, or Firm—Hibben, Noyes & Bicknell

[57] ABSTRACT

An emissions control system for eliminating or substantially reducing the levels of hydrocarbons, carbon monoxide, oxides of nitrogen and other noxious components in the exhaust gas flow from the internal combustion engine of an automotive vehicle or the like to permissible levels. The system includes a reaction device adapted to be connected to the exhaust gas flow from the engine and having one or more ceramic reaction elements therein which cause the undesirable components in the exhaust gas flow to oxidize, disassociate or otherwise become innocuous before being discharged into the atmosphere. An engine driven air pump supplies air under pressure to the reaction device, and a spark plug is mounted in the device and connected to a suitable high voltage source so that a spark is maintained across the electrodes of the spark plug when the engine of the vehicle is either cold or idling, or when the vehicle is decelerating. An electrical circuit controls the operation of the high voltage source, such circuit including a thermal switch responsive to the operating temperature of the engine and a normally closed push button switch positioned so as to respond to movement of the accelerator pedal or throttle linkage of the engine. The emissions control system also includes a distributor rotor having an auxiliary contact arm which causes the spark plugs of the engine to fire a second time during the operating cycle of the respective cylinders, such second firing occurring at or near the beginning of the exhaust strokes of the pistons of the respective cylinders.

7 Claims, 6 Drawing Figures

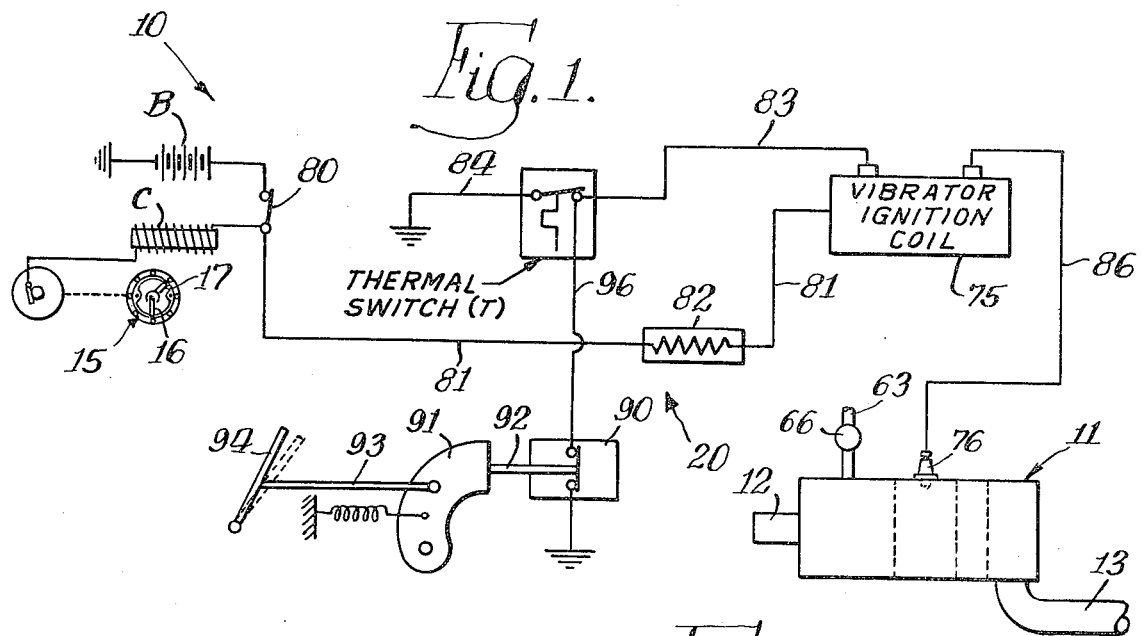
Fig. 1.
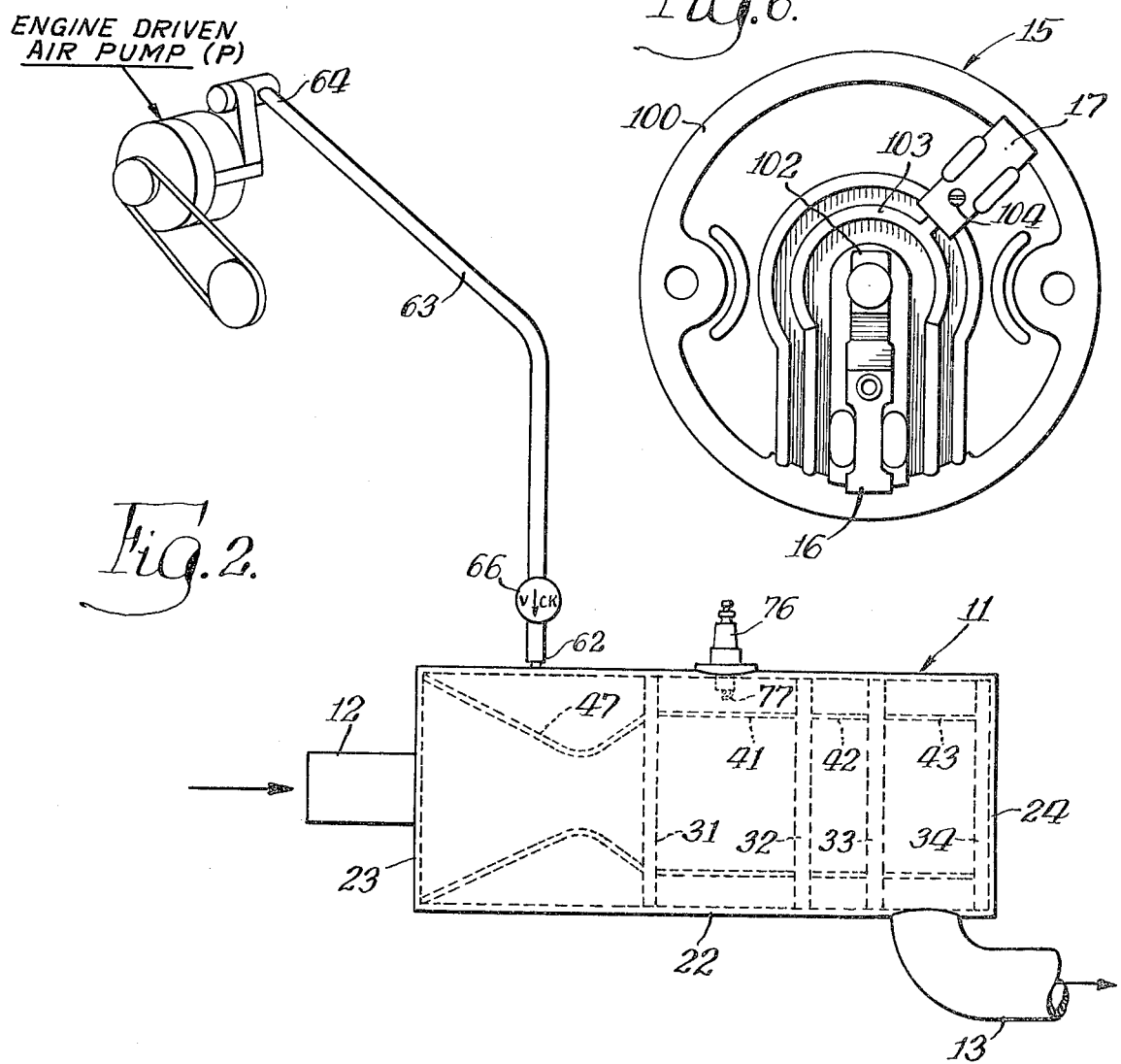
Fig. 6.
Fig. 2.

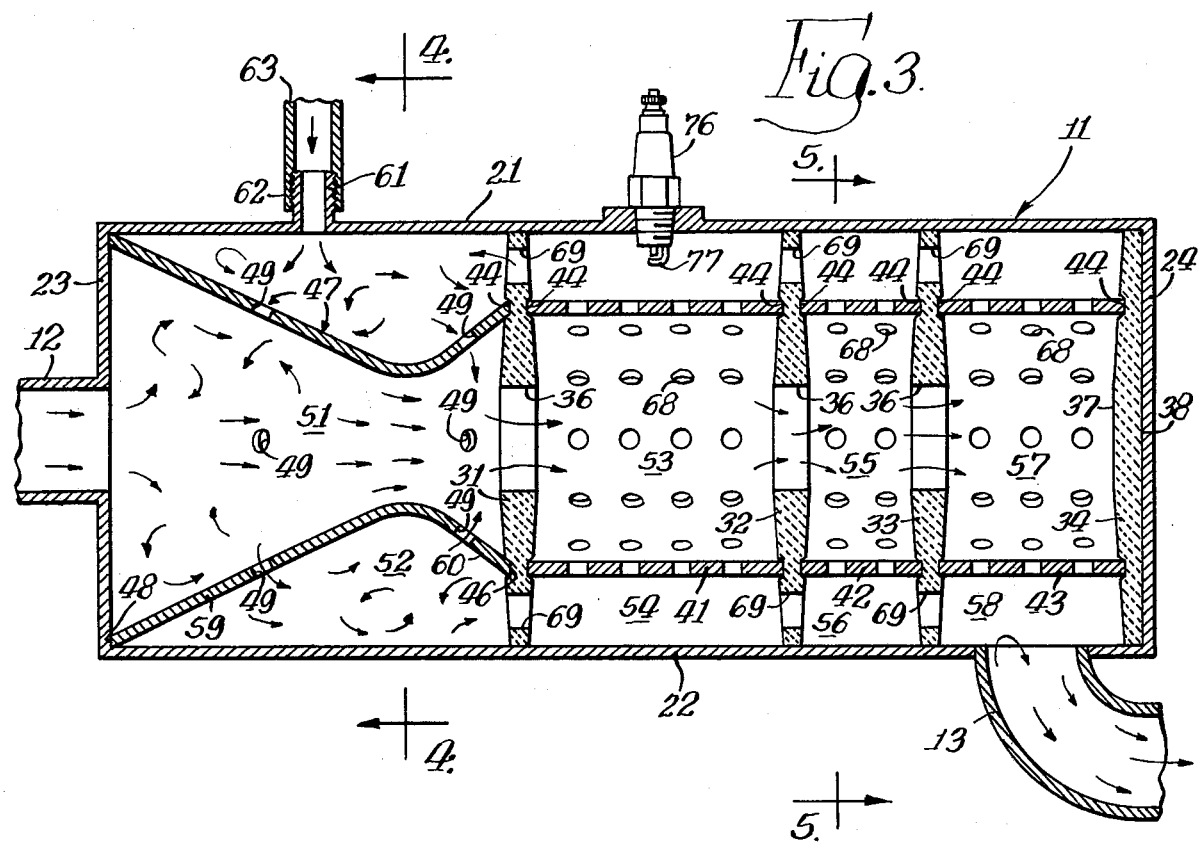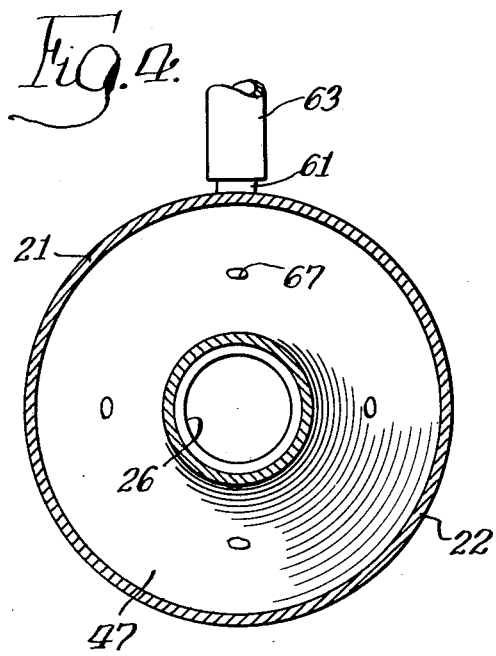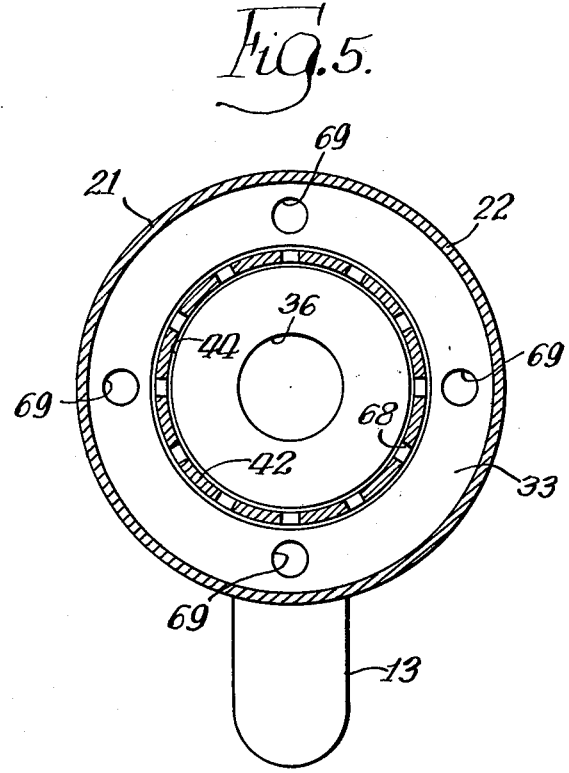

EMISSIONS CONTROL SYSTEM FOR AN AUTOMOTIVE VEHICLE OR THE LIKE

This invention relates to emissions control systems, and more particularly relates to an emmisions control system for an automotive vehicle or the like.

Various types of emissions control systems and devices have been heretofore and are presently being developed for controlling the emmisions from automotive vehicles in order to meet federal and State clean air standards. While many of the systems presently in use accomplish this objective in varying degrees, most of such systems have been objectionable for various reasons such as high cost, short life, complexity of construction and lack of reliability in operation.

In this regard, some of the aforementioned systems utilize afterburner-type mufflers which react with the undesirable constitutents in the exhaust gas to either eliminate or reduce the levels of the objectionable constituents in the exhaust gas flow to permissible levels. An example of one such afterburner device which performs this function is disclosed in the Eannarino, et al. U.S. Pat. No. 3, 435, 613.

Muffler-type afterburning devices have also been developed for removing objectionable components from the exhausts gases from automobile engines, which utilize heater elements for reacting with and removing objectionable components from the exhaust gas flow and which employ ceramic or asbestos disks to support the heater elements in the device. An example of such an afterburning device of the foregoing type is disclosed in the Buttler, U.S. Pat. No. 2,981,057.

In addition, ignition systems for spark ignited internal combustion engines have been developed, which seek to reduce the level of unburned fuel in the exhaust gas flow of the engine by firing the spark plugs of the engine twice during each cycle of operation of the respective cylinders. Such ignition systems cause a spark to occur at the electrodes of the spark plugs first at the commencement of the power stroke of the pistons and then again during the first half of the exhaust stroke of the respective cylinders. An example of an ignition system having the foregoing mode of operation is disclosed in the Elberson U.S. Pat. No. 3,430,617. The ignition system disclosed in the Elberson patent, however, contemplates the use of two ignition coils or a single coil of sufficient capacity to simultaneously fire two spark plugs.

Accordingly, it is a general object of the present invention to provide a novel emissions control system for eliminating or substantially reducing the levels of undesirable or noxious components in the exhaust gas flow from an internal combustion engine or the like to levels permitted by federal and State clean air regulations.

A more particular object is to provide a novel emissions control system for an automotive vehicle, which takes the place of the usual exhaust muffler of the vehicle and which is capable of reducing the emissions from the vehicle to levels below those permitted by federal and State clean air regulations.

Another object is to provide a novel emissions control system of the foregoing character, which is particularly adapted to reduce the levels of hydrocarbons, carbon monoxide and oxides of nitrogen in the exhaust gas flow from an internal combustion engine.

A specific object is to provide a novel combination muffler and reaction device for use in an emissions control system of the character described, wherein the primary reacting elements of the device are a ceramic formed from fired fire clay.

A further object is to provide a novel reaction device of the foregoing character, wherein the reaction element is porous and reinforced by a metallic strengthening material.

Still another object is to provide a novel electrical circuit for controlling the operation of a spark ignition means in a reaction device of an emissions control system for an automotive vehicle.

A further object is to provide a novel electrical control circuit of the foregoing character, which renders the spark ignition means operable when the temperature of the engine is subnormal and when the accelerator pedal or throttle actuating mechanism of the vehicle is in an idle position.

A still further object is to provide a novel distributor rotor construction for the disbributor of an internal combustion engine havine an emissions control system connected thereto, which is effective to improve the efficiency of the associated emissions control system by causing the spark plugs of the engine to fire at the beginning of the exhaust strokes of the respective pistons in addition to the usual firing at the end of the compression strokes of the pistons.

Another object is to provide a novel emissions control system for an automotive vehicle which is capable of reducing the emissions from the engine to permissible levels and which permits the engine to be adjusted to pre-emission control standards for maximum power output and operating efficiency.

A further object is to provide a novel emissions control system for an automotive vehicle, which is simple in construction, reliable and efficient in operation, economical to manufacture and maintain, and which has a long useful life.

These and other objects of the invention will become apparent from the following detailed description and accompanying sheets of drawings, wherein:

FIG. 1 is a semi-diagrammatic view of an emissions control system embodying the features of the present invention;

FIG. 2 is a semi-diagrammatic view of a portion of the emissions control system of FIG. 1 and showing additional details of the system;

FIG. 3 is a longitudinal sectional view through the reaction device of the emissions control system illustrated in FIGS. 1 and 2;

FIGS. 4 and 5 are transverse sectional views taken along the lines 4—4 and 5—5 of FIG. 3; and FIG. 6 is a plan view of a distributor rotor construction embodying the features of the present invention and comprising another portion of the emissions control system.

In FIG. 1, an emissions control system embodying the features of the present invention is semi-diagrammatically illustrated and indicated generally at 10. The primary component of the control system 10 is a combination muffler-reaction device, indicated generally at 11, which is connected to the exhaust system of the vehicle with which the system 10 is associated and which functions to reduce the levels of hydrocarbons, carbon monoxide, oxides of nitrogen and other noxious constituents in the exhaust flow from the engine to levels permitted by federal or State regulations before the exhaust is discharged into the atmosphere. The exhaust gases enter the muffler-reaction device 11, which is of a low back pressure design, through an inlet 12 and leave the device 11 through an outlet 13.

Another component of the control system 10 which contributes to the reduction of the levels of hydrocarbons, carbon monoxide and oxides of nitrogen in the exhaust gas flow from the engine is a modified distributor rotor 15, which includes a primary contact arm 16 for causing the spark plugs of the engine to fire at or near the beginning of the power strokes of the respective pistons, and an auxiliarly contact arm 17 for causing the spark plugs of the engine to fire a second time at the beginning of the exhaust strokes of the respective pistons. The manner in which the distributor rotor 15 contributes to the reduction of the emissions of the engine with which the control system 10 is associated, will be described more fully hereafter.

The control system 10 also includes spark ignition means mounted in the reaction device 11 and control means in the form of an electrical circuit, indicated generally at 20, for maintaining the operating efficiency of the reaction device 11 when the engine of the associated vehicle is cold or idling, and when the vehicle is decelerating. The manner in which the control circuit 20 performs the latter functions will likewise be described more fully hereinafter.

Referring now to FIGS. 2 and 3 in conjunction with FIG. 1, it will be seen that the reaction device 11 comprises an elongated housing 21 having a peripheral side wall 22 and opposite end walls 23 and 24, respectively. A pipe, comprising the inlet 12, is centrally mounted in the end wall 23 and another pipe, comprising the outlet 13, is welded or otherwise secured in an opening in the side wall 22 adjacent the end wall 24. The inlet pipe 12 is adapted to be connected to the exhaust pipe of the vehicle in which the device 11 is installed and the outlet pipe 13 is adapted to be connected to the tail pipe of the vehicle.

According to the present invention, reacting means is provided in the housing 21 of the device 11 for coaction with the flow of exhaust gases through the housing to reduce the levels of hydrocarbons, carbon monoxide, oxides of nitrogen and other constituents in the exhaust flow to permissible levels, or substantially eliminating such constituents before the exhaust flow enters the outlet pipe 13 and is discharged to the atmosphere. Such reacting means comprises at least one and preferably a plurality of reacting elements mounted in the housing 21 so as to be in intimate flow relationship with the exhaust gas flow passing through the device 11. Each reacting element, in the present instance, is of a ceramic material that is preferably made from clay obtained from coal mines and sometimes referred to as "fire clay" or "white clay". As shown in FIGS. 3, 4 and 5, the reacting elements are of plate-like form, specifically disks indicated at 31, 32, 33 and 34. The disks 31-33, inclusive, have slightly convex side faces and are each provided with a central aperture 36 therethrough. Only the side 37 of the disk 34 is convex, however, and no opening is provided in this disk. The other side, indicated at 38, of the disk 34 is flat and engages the inner side of the end wall 24.

In order to maintain the disks 31-34 in axially spaced relation in the housing 21 and to divide the housing into reaction chambers through which the flow of exhaust gas from the engine passes, spacer means is provided. Such spacer means preferably comprises three coaxially arranged, perforated tubes 41, 42 and 43 having their respective ends engaged in annular grooves 44 in the side faces of the disks 31-34, inclusive. The disk 31 is held against the adjacent end of the tube 41 by the downstream or diffuser end, indicated at 46, of a venturi 47 which comprises mixing means in the housing 21. The nozzle or inlet end, indicated at 48 of the venturi 47, engages the end wall 23 of the housing. Thus, the disks 31, 32 and 33, together with the venturi 47 and spacers 41, 42 and 43, divide the interior of the reaction device 11 into a plurality of reaction chambers through which the flow of exhaust gas from the engine passes and in which the reduction in the levels of hydrocarbons, carbon monoxide, oxides of nitrogen and the like, takes place. Such chambers are respectively indicated at 51-58, inclusive, in FIG. 3.

In order to render the disks 31-34 porous so that some of the exhaust gases from the engine can pass through the disks, a quantity of combustible material is added to the clay from which they are made prior to the firing of the disks, i.e., when the disks are in an amorphous state. While various substances may be employed for this purpose, charcoal made from oak or hickory wood, or powdered aluminum, is preferred. The desired porosity has been obtained when about 7 percent by volume of combustible material is added to the clay before the same is fired. In this regard, a firing temperature range of between about 1800°F to about 2300°F is preferred.

In order to reinforce the disks 31-34, inclusive, I prefer to add a quantity of strengthening material to the clay prior to firing. While various types of strengthening materials may be employed, particulate cast iron, e.g., iron filings or silica sand is preferred and in a quantity amounting to about 7 percent by volume of the total material of the disks.

Elimination or substantial reduction of the levels of hydrocarbons, carbon monoxide, oxides of nitrogen and the like from the exhaust gas flow passing through the device 11 depends in part upon the addition and mixing of oxygen with the flow prior to the time that the flow comes into contact with the disks 31-34, inclusive. To this end, the venturi 47 is provided with at least one and preferably a plurality of apertures 49 in the nozzle and diffuser portions 59 and 60 thereof, and an auxiliary air inlet 61 is provided on the side wall 22 of the housing 21 so as to communicate with the chamber 52 surrounding the venturi 47. The auxiliary air inlet 61 receives air from one end, indicated at 62, of a pipe 63. The opposite end, indicated at 64 in FIG. 2, of the pipe 63 is connected to a source of air under pressure in the present instance an engine-driven air pump indicated at P and identified by legend in FIG. 2. A check valve 66 (FIG. 2) may be mounted in the pipe 63 to prevent backflow from the device 11 through the pipe 63.

With the foregoing construction, it will be apparent that as the flow of hot exhaust gas from the engine enters the inlet 12 of the reaction device 11 and flows into the upstream end of the venturi 47, the velocity of the flow will increase it as it moves through the nozzle portion 59 of the venturi and then decrease as it moves through the diffuser portion 60 of the venturi. Such increase and decrease in the velocity of the flow results in changes in the static pressure of the flow. Consequently, mixing of auxiliary air being supplied to the chamber 52 from the pipe 63 with the exhaust gas in the venturi 47 occurs through the apertures 49 in the nozzle and diffuser portions thereof.

As the exhaust gas flow proceeds through the diffuser portion 60 of the venturi and passes through the opening 36 in the disk 31, the pressure of the exhaust gas increases and the flow becomes turbulent. Consequently, intimate mixing of the auxiliary air from the pipe 63 with the exhaust gas flow occurs. The chambers 51 and 52 thus constitute the first stage of the device 11, which effects mixing of the exhaust gases with the supply of oxygen from the pipe 63.

As the oxygen enriched exhaust gas flow passes through the opening 36 in the disk 31, and, to a lesser extent, through the disk itself as a result of the porosity thereof, a reduction in the hydrocarbons, carbon monoxide and oxides of nitrogen in the exhaust gas flow occurs. Such reduction is believed to be due to the catalytic action of the white hot disk 31 (about 2300°F) which effects oxidation and/or disassociation of the aforementioned components of the exhaust gas flow.

After passing through the opening 36 in the disk 31, and also through the material of the disk, the partially purified exhaust gas flow enters the chamber 53. From the chamber 53, some of the exhaust gas flows outwardly through perforations, indicated at 68, in the spacer 41 into the chamber 54 and the major portion of the flow proceeds downstream into and through the chambers 55 and 57 via the openings 36 in the disks 32 and 33. The portion of the exhaust gas flow into the chamber 54 divides and proceeds upstream and downstream from the chamber 54 through a plurality of holes 69 in the disks 31–33, the holes 69 being arranged radially outwardly of the spacers 41–43. Thus, oxidation and/or disassociation of the noxious components of the exhaust gas flow continues as the flow passes around and through the disks 31—33, inclusive, across the surface 37 of the disk 34, and through the chambers 55–58, inclusive of the device 11. The perforations in the spacers 42 and 43, which permit recirculation between the chambers 55, 56, 57 and 58, are indicated at 68. When the exhaust flow reaches the chamber 58, the levels of the aforementioned hydrocarbons, carbon monoxide and oxides of nitrogen therein are reduced to the point that little or no further treatment of the exhaust gas may be necessary.

As heretofore mentioned, the emissions control system 10 also includes spark ignition means in the device 11, and control means in the form of an electrical circuit 20 for controlling the operation of the spark ignition means. The spark ignition means assures efficient operation of the reaction device 11 when the engine of the vehicle with which the system 10 is associated is either cold or idling, and when the vehicle is decelerating. Such spark ignition means, in the present instance, comprises a high voltage source, such as a vibrator ignition coil, indicated at 75 in FIG. 1 and identified by legend, and a spark plug 76 or some other suitable high voltage discharging device, mounted in the device 11. Specifically, the spark plug 76 is mounted so that the electrodes 77 thereof (FIG. 3) extend into the chamber 54 or second stage of the reaction device 11.

As will be apparent from FIG. 1, the control circuit 20 is connected to one of the terminals of the ignition switch, indicated at 80, of the vehicle so that power is supplied to the primary circuit of the vibrator ignition coil 75 through a wire 81 when the igntion switch 80 is closed. A voltage dropping resistor 82 may be provided in the wire 81 between the switch 80 and the ignition coil 75, if necessary.

Another wire 83, forming part of the primary circuit of the vibrator ignition coil 75, is connected to the stationary contact of a thermal switch indicated at T, identified by legend and comprising a temperature responsive control member. The other or movable contact of the thermal switch is connected to ground through a wire 84. Thus, an intermittent high voltage will be supplied from the vibrator coil to the spark plug 76 through a high tension wire 86 so long as the thermal switch T and ignition switch 80 are closed. However, when the thermal switch T opens after the temperature responsive portion thereof has been exposed to a predetermined temperature, such as the normal operating temperature of the engine, the ignition coil 75 will normally be de-energized so that no spark occurs across the electrodes 77 of the spark plug 76. To this end, the thermal switch T may be mounted on the intake manifold of the engine, or in some other location such will permit the thermal switch to be exposed and/or respond to the operating temperature of the engine.

The control circuit 20 also includes another control member in the form of a normally closed switch 90 mounted on the vehicle so as to be responsive to movements of the accelerator pedal or throttle actuating mechanism of the engine. The switch 90, in the present instance, is a normally closed, push-button type, and is shown mounted adjacent to the carburetor throttle cam 91 so that the plunger, indicated at 92, of the switch 90 is engaged by the cam 91. A wire 96 connects one of the contacts of the switch 90 with the stationary contact of the thermal switch T and the other contact of the switch 90 is connected to ground. The arrangement is such that the switch 90 is closed so long as the accelerator pedal 94 is in its idle position illustrated in full line in FIG. 1, but opens when the accelerator pedal is depressed from this position. Consequently, since the thermal switch T and push-button switch 90 are in parallel, current will be supplied to the vibrator coil 75 and a high voltage spark maintained across the electrodes 77 of the spark plug 76 whenever either of the switches is closed. However, when the engine reaches normal operating temperature and the thermal switch T opens, operation of the vibrator coil 75 will be under the sole control of the switch 90.

Thus, when the engine of the vehicle with which the emissions control system 10 is associated is cold, the thermal switch T will maintain a spark across the electrodes 77 of the spark plug 76 so as that a sufficiently high temperature will be maintained in the reaction chambers 53–58 of the reaction device 11 to effect the desired reduction in the levels of hydrocarbons, carbon monoxide and oxides of nitrogen in the exhaust gas flow. After the engine reaches normal operating temperature and the thermal switch T has opened, the vibrator coil 75 will be energized to maintain a high voltage spark across the electrodes 77 of the spark plug 76 whenever the accelerator pedal 94 is in its idle position illustrated in full lines in FIG. 1. Consequently, the temperature in the chambers 53–58 of the device 11 will likewise be maintained when the engine of the vehicle is idling or the vehicle is decelerating and the driver has removed his foot from the accelerator pedal.

As previously mentioned, the emissions control system 10 includes a modified distributor rotor 15, which contributes to the reduction of hydrocarbons, carbon monoxide and oxides of nitrogen in the exhaust gas flow. As will be apparent from FIG. 6, the modified distributor rotor 15 includes the usual or primary contact arm 16 mounted on the top of the body, indicated at 100, of the rotor and having its inner end 102 bent upwardly to engage the central contact of the distributor cap. The rotor 15 differs from conventional rotors in that it includes the auxiliary contact arm 17 which is also mounted on the top of the rotor body 100 so as to move into close proximity to the high tension contacts of the distributor cap in the same manner as the arm 16 when the rotor 15 is rotating. The arm 17 is angularly displaced from the arm 16 by an approximate angle of approximately 120° for an 8-cylinder engine. Thus, when the contact arm 16 effects the usual firing order of the cylinders of the engine when the pistons thereof are approaching the ends of their compression strokes, i.e., 1, 8, 4, 6, 5, 7 and 2, the auxiliary contact arm 17 will cause the spark plugs to fire a second time during the operating cycle of each cylinder when the pistons are beginning their power strokes, in the following order: 5, 7, 2, 1, 8, 4, 3 and 6.

The construction of the distributor rotor 15 differs from that of known similar constructions, one of which is disclosed in the Elberson U.S. Pat. No. 3,430,617, in that there is no direct physical connection between the auxiliary contact arm 17 and primary contact arm 16 nor is the arm 17 physically connected to the secondary windings of the primary ignition coil, indicated at C, in FIG. 1 in any manner. Instead, the contact arm 17 receives a high voltage pulse from the corona surrounding the inner end 102 of the main contact arm 16 when a high voltage impulse is being supplied to the main contact arm 16. To improve this action, the radially inner end of the auxiliary contact arm 17 is provided with a C-shaped collector 103 which substantially surrounds the inner end 102 of the primary contact arm 16. The collector 103 may be formed separately from the auxiliary contact arm 17 and secured thereto as by a screw or rivet 104, or may be formed integrally with the arm 17.

The second firing of each of the spark plugs of the engine at the beginning of the exhaust strokes of the respective pistons begins to reduce the level of hydrocarbons, carbon monoxide and particularly the oxides of nitrogen in the exhaust gas flow before the same is delivered to the reaction device 11 since the second firing of the plugs lowers the overall temperature of the cylinders. This results from the fact that the second firing of the spark plugs at the beginning of the exhaust strokes of the cylinders leaves a small quantity of burned gases in the cylinders which lowers the operating temperature in the cylinders. This is similar to what is now being done by the so-called E.G.R. (exhaust gas recirculating) systems. An additional benefit is achieved by the auxiliary contact arm 17 in the form of a smoother idle.

Quantitative tests have shown that the emissions control system 10 herein disclosed substantially completely eliminates hydrocarbons and carbon monoxide emissions from the exhaust gas flow of the engine on which it is installed and reduces the level of oxides of nitrogen to levels substantially below the present permissible standards. Moreover, the control system 10 does not require detuning of the engine in order to operate satisfactorily. Consequently, the engine of the vehicle on which the control system 10 is installed may be set to pre-emission control specifications so that maximum power output and gas mileage is obtained. Leaded fuels do not adversely effect the operation of the control system 10. In addition, the emissions control system 10 is highly effective in eliminating smoke from the exhaust gas flow from older vehicles having excessive oil consumption rates or other defects.

While the emissions control system 10 has been herein described in conjunction with an automotive vehicle application, it will be understood that the system may be used in non-automotive applications such as coal burning industrial power plants and the like where smoke and other undesirable emissions have heretofore been present in the exhaust gases produced when such plants are in operation. In the aforementioned industrial application, reaction elements constructed from the same materials as the disks 31–34 of the reaction device 11 would be employed to effect removal of the undesirable components. In addition, some form of supplemental heating device embedded in or attached to the reaction elements could be employed to raise the temperature of the ceramic reaction elements to a temperature (about 3000°F) sufficient to effect the desired oxidation and/or disassociation of the undesirable constituents in the exhaust gas flow. In addition, a cooling condenser and collecting reservoir could be employed to condense and collect particulate products obtained from the treated exhaust gas flow.

While only one embodiment of the invention has been herein illustrated and described in detail, it will be understood that modifications and variations thereof may be effected without departing from the scope of the invention as exemplified by the appended claims.

I claim:

1. A reaction device for eliminating or substantially reducing the level of hydrocarbons, carbon monoxide, oxides of nitrogen and the like in the exhaust gas flow from an internal combustion engine or the like, comprising an elongated housing having a peripheral side wall and opposite end walls, said housing also having an inlet in one of said end walls adapted to be connected to said exhaust gas flow, an outlet through which said exhaust gas flow may discharge, and an auxiliary inlet in said peripheral side wall adjacent to said one end wall and adapted to be connected to a source of air under pressure for supplying air to the interior of said housing, at least one reacting element mounted in said housing between said inlet and said outlet, said reacting element extending transverse to and across the longitudinal axis of said housing so as to be in intimate flow relationship with said exhaust gas flow through said housing, said exhaust gas outlet communicating with the interior of said housing downstream from said reacting element, and a venturi tube mounted in said housing and having a nozzle end and a diffuser end, the axis of said venturi tube extending lengthwise of said housing, the nozzle end of said venturi tube engaging said one end wall and surrounding said exhaust gas inlet, and the diffuser end of said venturi tube engaging said reacting element, said venturi tube and said housing defining a chamber therebetween surrounding said tube, said auxiliary air inlet being directly connected to said chamber, said venturi tube also serving to direct said exhaust gas flow to said reacting element and having at least one aperture in the side wall thereof to permit air from said auxiliary inlet to mix with said exhaust gas flow passing through said venturi tube, and said reacting element being of a porous ceramic material such as will cause the hydrocarbons, carbon monoxide, oxides of nitrogen and other noxious constituents of said exhaust gas flow to either disassociate or react with the oxygen supplied thereto through said auxiliary inlet so that said constituents are either eliminated or reduced to permissible levels before said exhaust gas flow is discharged through said housing outlet.

2. The reaction device of claim 1, in which a plurality of said reacting elements are mounted in said housing, and spacer means carried by said reacting elements is provided in said housing for maintaining said reacting elements in axially spaced relation.

3. The reaction device of claim 2, in which said reacting elements are of plate-like form, said spacer means comprises a tubular member disposed between adjacent reacting elements and arranged with its axis extending lengthwise of said housing, the ends of each tubular member engage the opposite side faces of an adjacent pair of said reacting elements, and said tubular member and an adjacent pair of reacting elements define an inner reaction chamber therebetween.

4. The reaction device of claim 3, in which said reacting elements have central openings therein, the diameter of said tubular member is less than the diameter of said reacting elements and greater than the diameter of said central openings so as to define an outer reaction chamber in said housing surrounding said tubular member, and said tubular member is perforated to permit fluid flow between said inner and outer reaction chambers.

5. A reaction device for eliminating or substantially reducing the level of hydrocarbons, carbon monoxide, oxides of nitrogen and the like in the exhaust gas flow from an internal combustion engine or the like, comprising an elongated housing having a peripheral side wall and opposite end walls, said housing also having an inlet in one of said end walls adapted to be connected to said exhaust gas flow, an outlet through which said exhaust gas flow may discharge, and an auxiliary inlet in said peripheral side wall adapted to be connected to a source of air under pressure for supplying air to the interior of said housing, a venturi tube mounted in said housing and having a nozzle end and a diffuser end, the axis of said venturi tube extending lengthwise of said housing and the nozzle end of said venturi tube engaging said one end wall and surrounding said exhaust gas inlet, a plurality of plate-like reacting elements mounted in said housing between said inlet and said outlet and extending transverse to and across the longitudinal axis of said housing so as to be in intimate flow relationship with said exhaust gas flow through said housing, said venturi tube serving to direct said exhaust gas flow to said reacting elements and to mix air from said auxiliary inlet with said exhaust gas flow, said reacting elements having central openings therein, a plurality of coaxially arranged, tubular spacer members disposed between adjacent reacting elements and having their axes extending lengthwise of said housing, the ends of each tubular member engaging the opposite side faces of an adjacent pair of said reacting elements so that said tubular members maintain said reacting elements in axially spaced relation, the diameter of said tubular members being less than the diameter of said reacting elements and greater than the diameter of said central openings so as to define a plurality of inner and outer reaction chambers in said housing, said tubular members being perforated to permit fluid flow between said inner and outer chambers said auxiliary inlet communicating with the interior of said housing upstream from said reacting elements and said exhaust gas outlet communicating with the interior of said housing downstream from said reacting elements, each of said reacting elements having at least one other opening therein spaced radially outwardly of said tubular members and providing communication between said outer reaction chambers, and said reacting elements being of a porous ceramic material such as will cause the hydrocarbons, carbon monoxide, oxides of nitrogen and other noxious constituents of said exhaust gas flow to either disassociate or react with the oxygen supplied thereto through said auxiliary inlet so that said constituents are either eliminated or reduced to permissible levels before said exhaust gas flow is discharged through said housing outlet.

6. The reaction device of claim 5, in which said outlet is located in the peripheral wall of said housing adjacent to the other of said end walls, and said outlet communicates with the outer reaction chamber of the pair of reacting elements adjacent to said other end wall.

7. The reaction device of claim 6, in which an imperforate reacting element is mounted in said housing adjacent to said other end wall so that the flow of exhaust gas impinges upon the surface of said imperforate reacting element before discharging through said outlet.

* * * * *